United States Patent [19]

Kushto

[11] 4,207,026
[45] Jun. 10, 1980

[54] TETHERED LIGHTER THAN AIR TURBINE

[76] Inventor: Oliver J. Kushto, 1410 US 92 West, Auburndale, Fla. 33823

[21] Appl. No.: 947,269

[22] Filed: Sep. 29, 1978

[51] Int. Cl.² .......................... F03D 11/00; F03D 1/06
[52] U.S. Cl. .......................................... 416/84; 416/86; 416/176
[58] Field of Search .................... 416/84–86, 416/121 A, 176 A, 126, 9–11; 415/7

[56] References Cited

U.S. PATENT DOCUMENTS

| | | | |
|---|---|---|---|
| 1,830,985 | 11/1931 | Dreier | 416/84 |
| 2,730,631 | 1/1956 | Dandini | 416/86 X |
| 3,229,517 | 1/1966 | Smith . | |
| 3,924,827 | 12/1975 | Lois | 416/9 X |
| 3,954,236 | 5/1976 | Brown | 416/85 |
| 4,073,516 | 2/1978 | Kling | 416/88 X |
| 4,083,652 | 4/1978 | Isaacson | 416/84 |
| 4,084,102 | 4/1978 | Fry et al. | 416/85 X |
| 4,124,182 | 11/1978 | Loeb | 416/84 X |

FOREIGN PATENT DOCUMENTS

| | | | |
|---|---|---|---|
| 482466 | 3/1917 | France | 416/86 |
| 547884 | 12/1922 | France | 416/9 |
| 827487 | 4/1938 | France | 416/176 A |
| 2381921 | 10/1978 | France | 416/85 |
| 353333 | 10/1937 | Italy | 416/9 |
| 466172 | 10/1951 | Italy | 416/9 |
| 7416134 | 6/1975 | Netherlands | 416/126 |

*Primary Examiner*—Everette A. Powell, Jr.
*Attorney, Agent, or Firm*—Robert W. Weig

[57] ABSTRACT

The disclosure relates to a wind turbine comprising a lighter than air body affixed to a drive line. Vanes or fins are attached about the body and turn the body in response to air currents acting thereon. This turns the drive line to supply rotational energy to a load.

8 Claims, 4 Drawing Figures

TETHERED LIGHTER THAN AIR TURBINE

FIELD OF THE INVENTION

The invention relates to devices for obtaining energy from air currents and in particular to converting such energy to useful energy by utilizing tethered lighter than air turbines.

BACKGROUND OF THE INVENTION

Man has utilized air currents, and in particular winds, as a source of energy for many years to, for example, propel sail boats and operate water pumping windmills. Although conventional windmills operate satisfactorily under suitable conditions, high winds may subject the propellers to excessive rotational forces; higher winds and wind gusts may blow over their supporting structure or cause other damage. In addition, conventional windmills cannot be readily taken down or disassembled for movement to another location for replacement, or if dangerously high winds are expected to occur. Conventionally structured windmills are also expensive to install and take considerable time to erect.

With wear, conventional windmills develop wobble problems, and at any time will not turn when no wind exists and only rising air currents known as thermals are the only source of air current or air movement.

SUMMARY OF THE INVENTION

In accordance with the present invention there is provided a tethered lighter than air wind turbine for producing rotational energy from air currents. The turbine comprises a lighter than air body having a light weight, semi-rigid, preferably tubular, drive line passing through it along a selected axis of rotation. The body is fixedly secured to the drive line by, for example, a harness, spoke members and clamps.

Appendages such as fins or blades are attached to the body in such a manner that passing air currents act on them to turn the body about its selected axis of rotation. The drive line tethers the body to the ground or to whatever it is desired the body be attached, such as a generator, transmission, or the like which will make use of the rotation of the body applied through the drive line.

One object of the present invention is to inexpensively provide rotational energy from air currents.

Another object of the instant invention is to provide useful rotational energy under a wide variety of wind conditions.

One advantage of the invention is that an apparatus in accordance therewith may be set up in the field in a minimal amount of time.

Another advantage of the invention is that an apparatus in accordance therewith can more easily be taken down and erected at another location or site than a conventional windmill.

BRIEF DESCRIPTION OF THE DRAWINGS

Other objects and advantages of the present invention will be apparent to those skilled in the art from the following description with reference to the appended drawings wherein like numbers denote like parts and wherein.

DETAILED DESCRIPTION OF THE INVENTION

Figure 1:
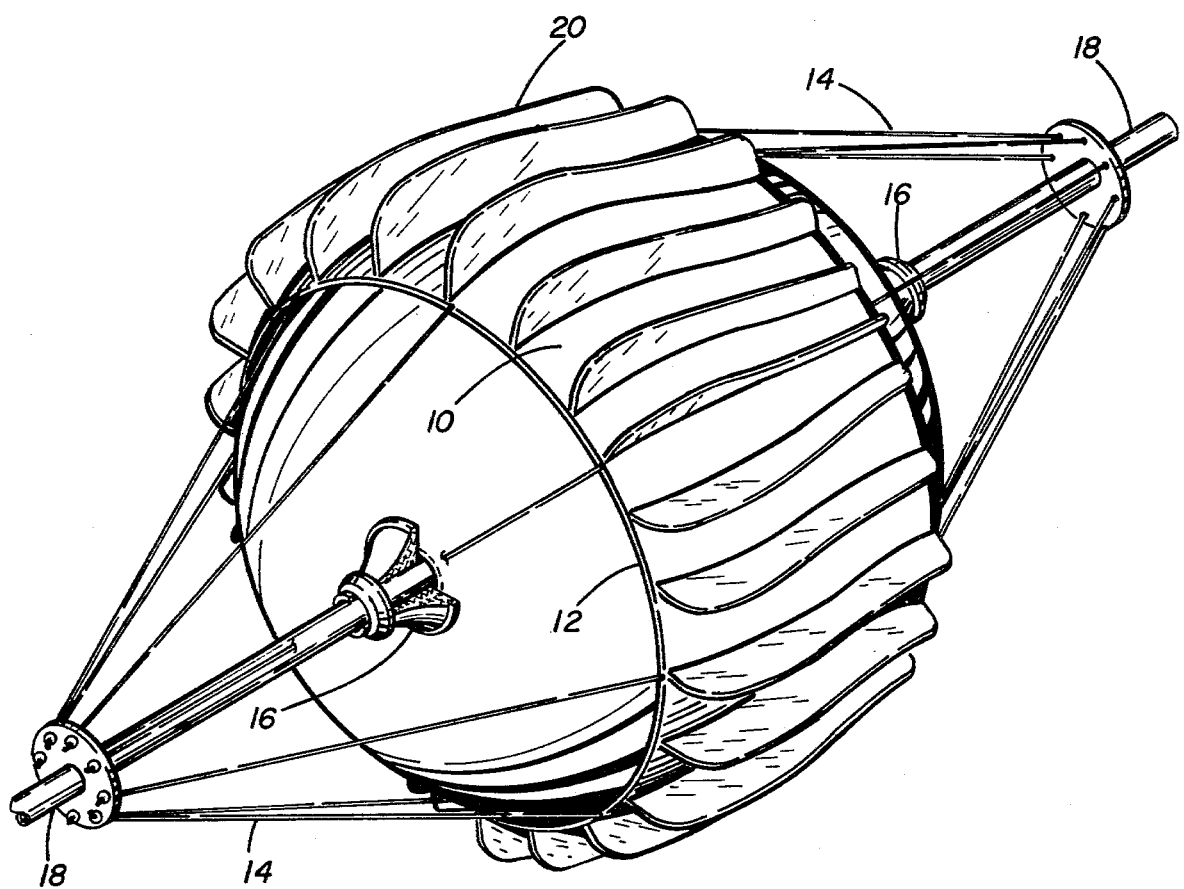
FIG. 1 illustrates a preferred embodiment of the invention.

Reference is now made to FIG. 1 which depicts a preferred embodiment of the invention, comprising a lighter than air body 10 affixed by a harness 12, spokes 14 and clamps 16 to a drive line 18. Body 10 may comprise a single chambered balloon or may comprise several separate gas chambers. An advantage to body 10 containing several chambers is that if one or a few are punctured by accident or vandalism, the body will stay aloft and the turbine operative until repairs can be made. The body 10 can be constructed of rubberized nylon, flexible plastics, rubber, and other well known materials used in the construction of lighter than air balloons, blimps, dirigibles and the like. Harness 12 can be nylon mesh and/or line designed to fit about body 10 sufficiently tight that little or no slippage occurs when torque is applied therebetween by the action of air currents such as wind on appendages or fins 20 affixed to harness 12. Such torque occurs because there will be resistance to the rotation of drive line 18 by a pump, generator, or whatever is operated by the rotation of drive line 18.

Fins 20 may be epoxied or otherwise affixed to harness 12. As shown, appendages 20 are curved wing-like members, but they may be of any shape, design and construction suitable for turning body 10 in response to the action of air currents on them. Appendages 20 may be formed of aluminum, plastic, nylon, and other suitable rigid and light weight materials. Appendages 20 may be solid or hollow but should be sufficiently rigid to withstand expected wind forces and weather durable. The fins may be flat, curved, planar, cup-like, or wedge-like inflatable members or of any other suitable shape. Those skilled in the art will recognize that there will be a wide variety of shapes and materials of which fins may be constructed. Certain fins will function better than others under different conditions. Users in high wind areas will use different types of fins than those in low wind areas. Altitude of use will also be a factor due to differences in air densities.

Spokes 14 are affixed between harness 12 and drive line 18 and may comprise aluminum, nylon cord, or other light weight sufficiently strong material which may be flexible or somewhat rigid. Drive line 18 preferably comprises a light weight hollow pipe constructed from aluminum or other light weight weather resistant material. It may also comprise polyvinyl chloride or other light weight, durable, temperature and weather variation resistant plastic or natural material. At least the portion of drive line 18 passing through body 10 should be somewhat rigid to offer good structural support for the body as well as sturdy fastening thereto by clamps 16 and spokes 14. Drive line 18 disposed between the lower attachment of spokes 16 at a ring 19 and a universal joint 24 seen in FIG. 2 may alternatively be a cable sufficiently torque resistant to effectively turn a load 26 such as a generator, pump, or the like.

Figure 2:
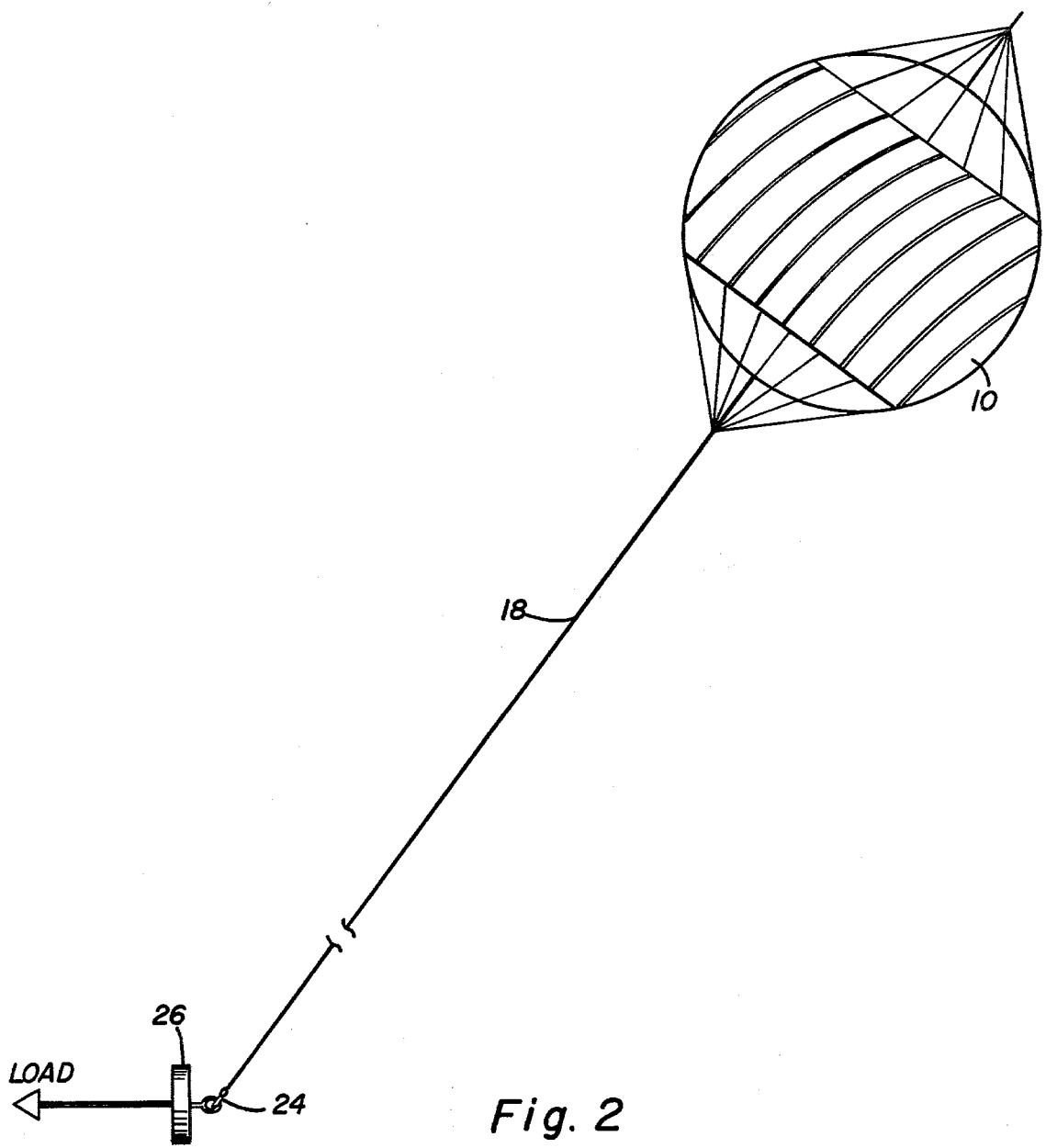
FIG. 2 shows the embodiment of FIG. 1 tethered and operating in a moderate wind.
Figure 3:
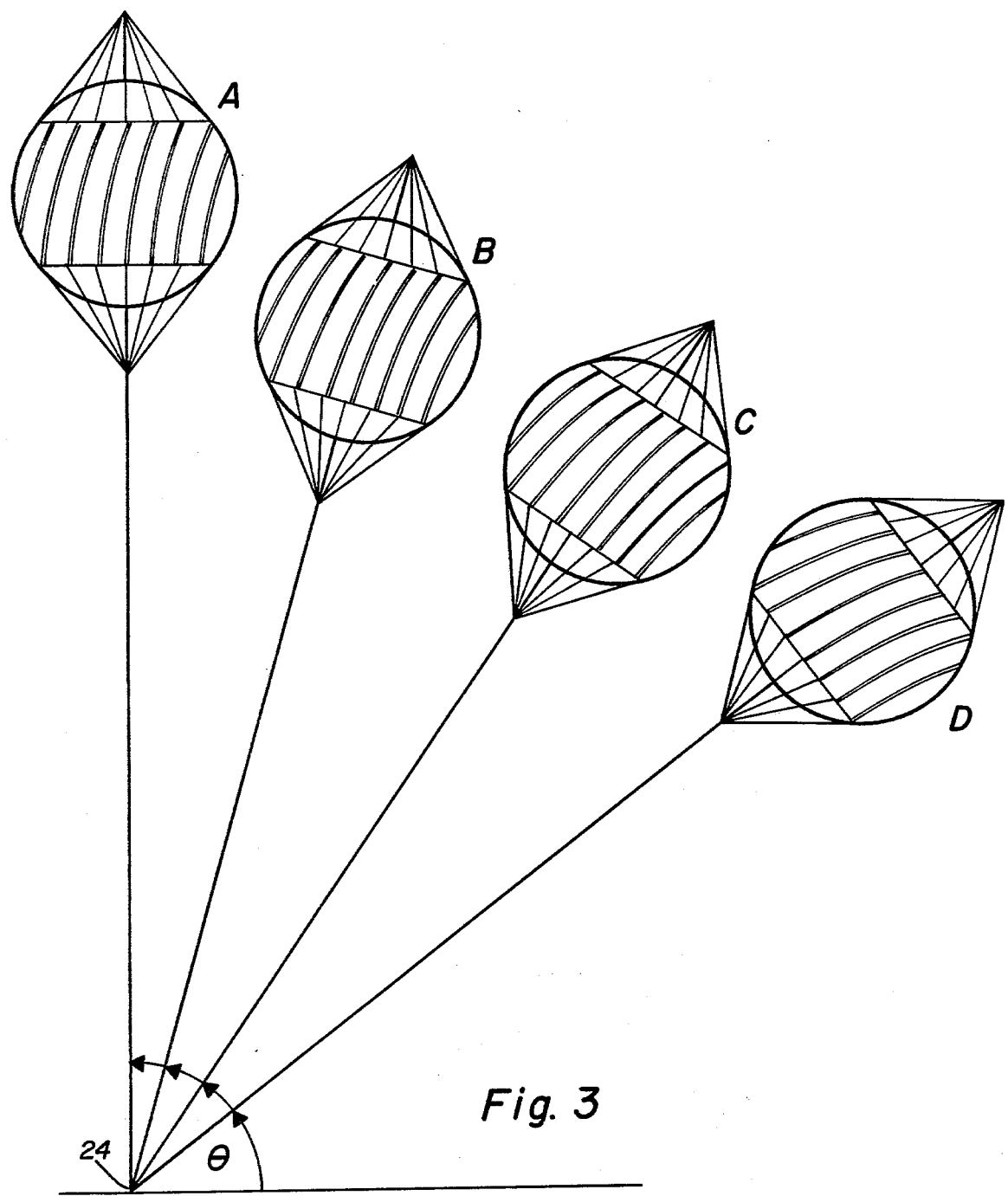
FIG. 3 shows the FIG. 2 structure operating in winds of different velocities.

FIG. 2 shows the embodiment of FIG. 1 in operation in a moderate wind. Those skilled in the art will appreciate that, as seen in FIG. 3, in no wind, the turbine will essentially rest vertically above universal joint 24 in position A. In this position it may turn if rising air currents or thermals are present and sufficiently strong. In breezes, it will move to a small angle from the vertical such as position B, and in greater winds to a position like C. Strong winds will cause the drive line of the turbine to achieve a large angle from the vertical such as position D. The turbine adjusts for varying winds in that the angle of attack the fins 20 make with winds, represented by the arrows in FIG. 3, varies with the turbine drive line angle with reference to the vertical $\theta$. Low winds impinge at low angles to the normal of the surface of the fins. The higher the wind, due to the change in angle $\theta$, the greater angle to the normal the wind impinges on the fins 20. This feature causes the turbine speed to vary less as a function of wind speed than does conventional windmill blade speed, which is entirely responsive to and dependant upon wind speed. Thus, a pump or a generator can be more stably and effectively operated under a far broader range of wind speeds than is possible with fixed blade angle conventional windmills. The wind turbine of the invention solves the problem of getting a relatively constant or stable load speed under varying wind conditions.

Figure 4:
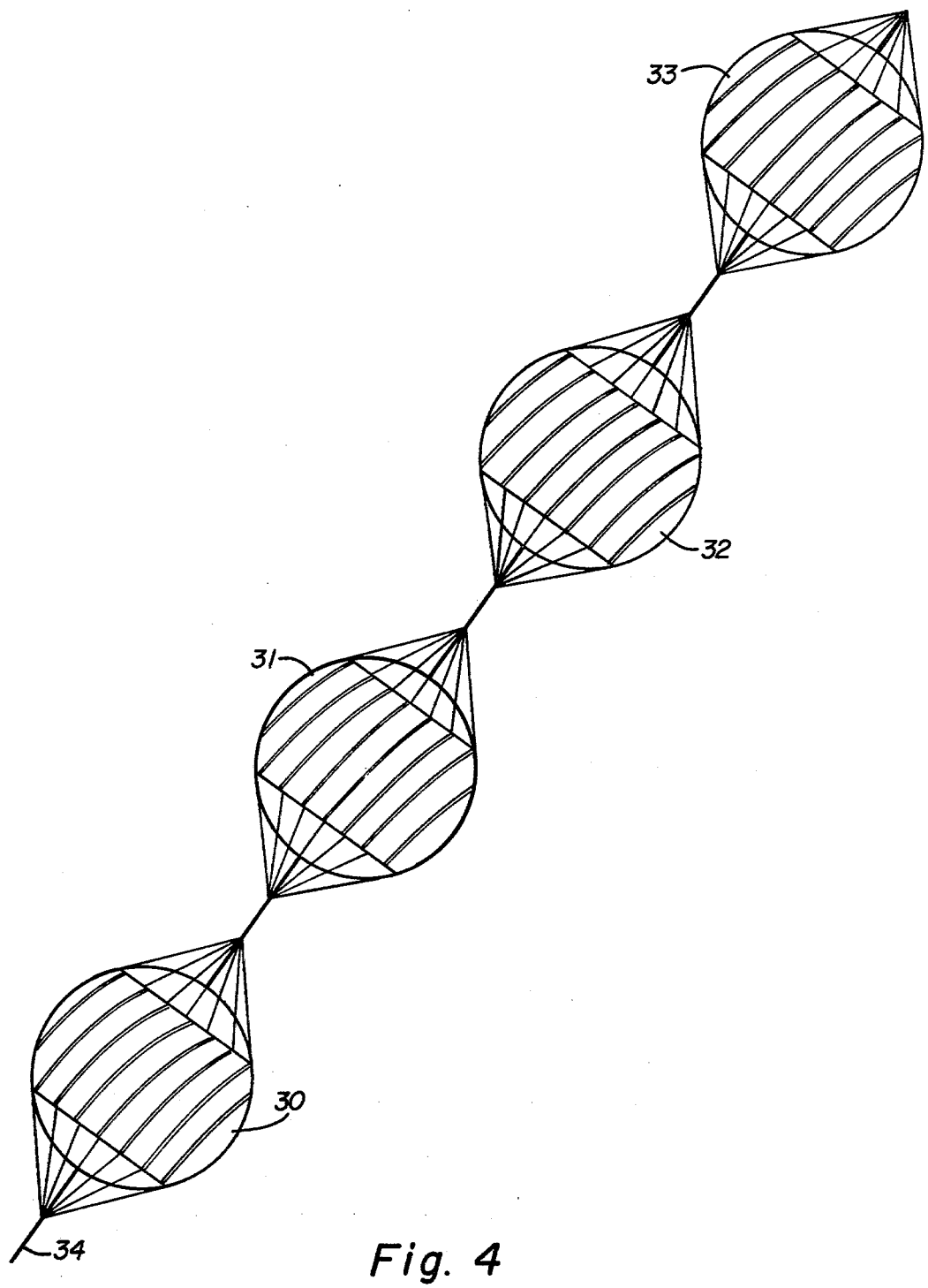
FIG. 4 shows the use of a plurality of turbines on a single drive line.

FIG. 4 shows a plurality of wind turbines 30, 31, 32 and 33 on a single drive line 34. This arrangement can be used to develop more torque than a single turbine. Too, smaller and therefore easier to handle individual turbines can be used. Smaller turbines are also more easily transported than larger ones and if one deflates, the others will keep the arrangement functioning until the inoperative one is replaced. Only one size need be stocked, the output power of a generator depending on the number of turbines on a line. A plurality of turbines on a single line also increases the generator's ability to take advantage of higher or lower velocity winds occurring at different above ground heights.

Helium, hydrogen and other lighter than air gases may be used to inflate body 10. Hydrogen is inexpensive and may be used where the danger of fire is minimal or where a turbine fire or explosion would be no safety hazard, such as at a remote site.

The turbine is essentially frictionless in operation and therefore more efficient than conventional windmills which suffer friction losses in their bearings. The only friction occurs at universal 24 or in the load, if drive line 18 is directly attached thereto. There is no need for the periodic lubrication required by convention windmills. Lightening hazard is minimal and there is no possible electrolytic action on metal components.

Massive structural supports, directional devices and cumbersome devices to change from vertical to horizontal positions are not needed.

The invention can be used to drive generators to store electrical energy in batteries for later use, to run water heaters, to assist in heating buildings as well as to run irrigation pumps, and other pumps to, for example, fill stock watering tanks and the like. A multitude of uses for slightly variable rotational energy will be apparent to those skilled in the art.

The various features and advantages of the invention are thought to be clear from the foregoing description. However, various other features and advantages not specifically enumerated will undoubtedly occur to those versed in the art, as likewise will many variations and modifications of the embodiments illustrated, all of which may be achieved without departing from the spirit and scope of the invention as defined by the appended claims.

I claim:

1. A tethered lighter than air turbine for producing rotational energy from air currents comprising:
   a lighter than air body having an axis of rotation;
   a drive line having two ends, said line being affixed to said body at one end and aligned along said axis of rotation;
   appendages attached to said body and disposed thereon for causing said body to rotate about said axis of rotation when air currents impinge upon said appendages;
   means attached to the other end of said drive line for connecting said line to a load.

2. The invention of claim 1 wherein said means comprise means providing for rotational energy to load transfer throughout a range of angles.

3. The invention of claim 1 wherein said body comprises a plurality of noncommunicating compartments for containing lighter than air gases.

4. The invention of claim 1 wherein said appendages comprise fins outwardly spaced from said axis of rotation at such angle that said body rotates at about the same speed at differing wind speeds by the drive line forming different angles with respect to the horizontal where said body is tethered.

5. The invention of claim 1 wherein said appendages comprise fins disposed perpendicularly to the surface of said body and at angles to its axis of rotation.

6. The invention of claim 1 wherein said drive line is flexible.

7. The invention of claim 6 wherein said drive line comprises a metal cable.

8. The invention of claim 1 wherein said drive line is substantially inflexible to torque applied thereto.

* * * * *